Feb. 17, 1953  E. R. JAGENBURG  2,628,648
TILTABLE FEED FOR FRUIT AND
VEGETABLE CUTTING MACHINES
Filed May 26, 1949  2 SHEETS—SHEET 2
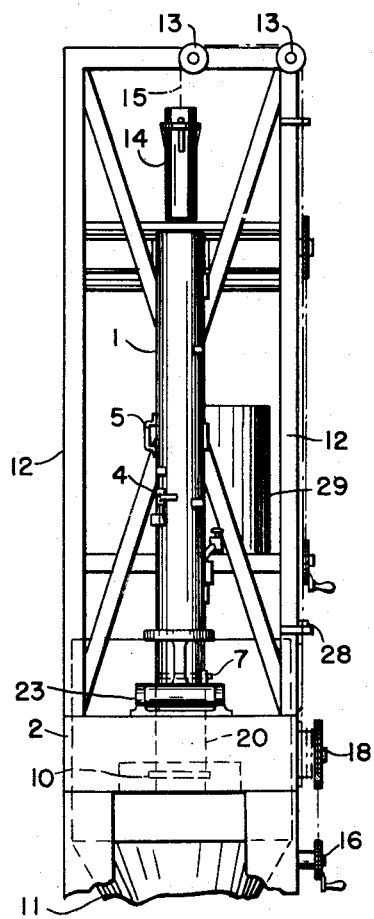
Fig-3-
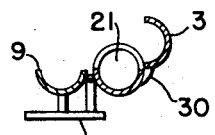
Fig-8-
Fig-7-
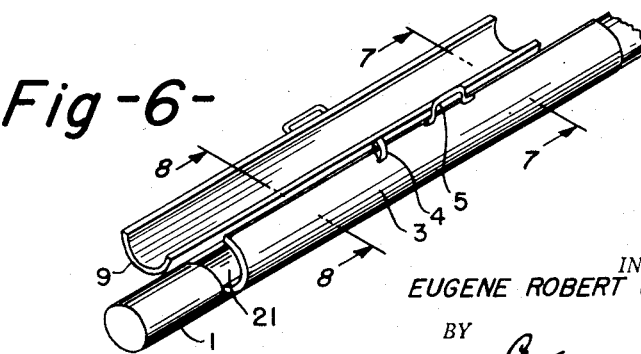
Fig-6-
INVENTOR.
EUGENE ROBERT JAGENBURG
BY
ATTORNEY Patented Feb. 17, 1953

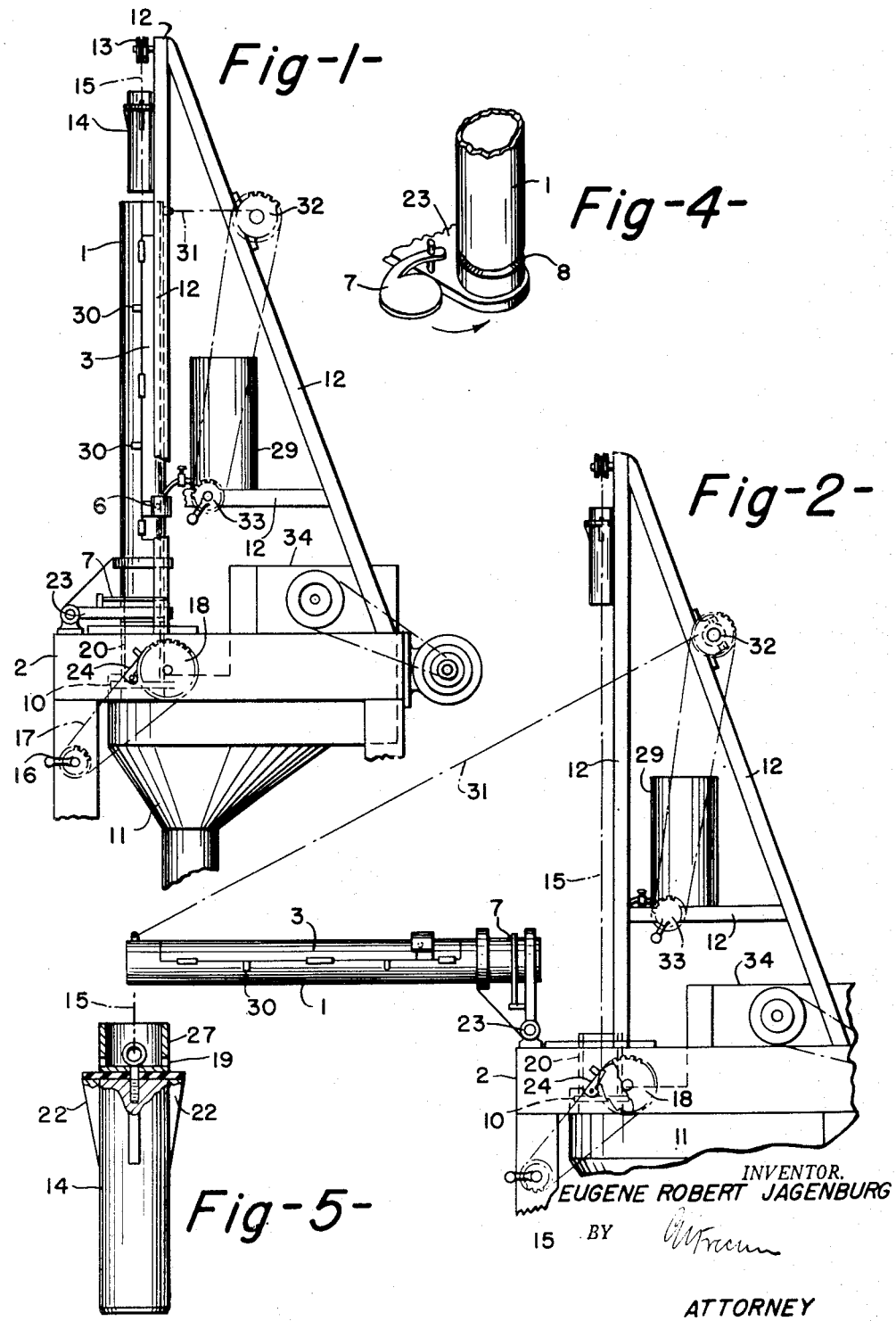

2,628,648

UNITED STATES PATENT OFFICE 2,628,648

TILTABLE FEED FOR FRUIT AND VEGE-
TABLE CUTTING MACHINES

Eugene Robert Jagenburg, Brooklyn, N. Y.

Application May 26, 1949, Serial No. 95,409

1 Claim. (Cl. 146—6)

This invention relates to fruit and vegetable cutting machines of the type disclosed in my U. S. Patent No. 1,418,443, issued June 6, 1922; these machines are provided with a fruit receiving receptacle wherein cutter blades are mounted for a reciprocative movement with respect to this receptacle. A fruit and vegetable feeder for use with this cutting machine is described in my prior U. S. Patent No. 2,236,176, issued March 25, 1941.

In conformity with the disclosure in this patent the machine comprises a stationary fruit receiving receptacle, pusher discs mounted for a reciprocating movement with respect to this magazine and for rotative movement into and out of coaxial relation therewith and means tiltable in timed relation to alternatively reciprocate the pusher discs and to rotate the same at opposite ends of their reciprocative movement into and out of coaxial relation with the magazine.

Practical experience with this machine revealed operational drawbacks.

The feed pressure exerted by the pusher discs onto the fruits and vegetables is inflexible and unalterable; the disadvantage of this feeding system is particularly apparent with pineapples which more or less fill the cutter receptacle and are to be divided in portions of a predetermined cross sectional area, such as strips, cubes and the like. It happens frequently that the pineapples fed into the cutter receptacle become jammed and block the machine. This situation is rendered very perilous by the incessant and inflexible pressure of the pusher discs which not only causes interruptions of the machine operation with inherent plugging by the jammed fruit pieces but even breakage of the machine parts.

It is a primary object of the invention to provide a fruit feeder for cutting machines of the above designated type which supplies the fruits or vegetables to the cutter receptacle in a flexible manner whereby jamming of the fed articles is eliminated.

It is a further object of the invention to insure against work interruption and stoppages caused by the jamming of the fruits and the fruit portions in the cutter receptacle.

It is also an object of the invention to simplify and make easier the machine operation and to eliminate feed obstacles.

It is a further object of the invention to guarantee the attainment of fruit portions of the intended and desired size and shape.

It is another object of the invention to reduce the operational costs and to increase the output of the machine per time unit.

With the above and additional objects in view which will become apparent as this description proceeds the invention comprises in its broad aspect the installation of a tiltable feeder in coaction with a pusher or weight which flexibly transports the fruits or vegetables through the feeder into a cutter provided receptacle which may be constructed in conformity with my prior patents.

This improved feeding mechanism will now be described in detail and with reference to the accompanying drawings.

In the drawings which illustrate an embodiment particularly adapted for the cutting of trimmed and cored pineapples Fig. 1 is a side view of the fruit feeder in its operative position, Fig. 2 is a similar side view showing the feeder in the loading position, Fig 3 is a front view of the machine taken at an angle of 90° relative to the side views shown in Figs. 1, 2, Fig. 4 is a perspective view on an enlarged scale of the lower end of the fruit feeder, Fig. 5 is a detailed, partly sectional view of the fruit pusher effecting the transport of the fruits through the feeder into the cutter receptacle, Fig. 6 is a perspective view of a part of the fruit feeder in the loading state, Fig. 7 is a cross sectional view of the fruit feeder on line 7—7 of Figure 6 and Fig. 8 is a cross sectional view of the same on line 8—8 of Figure 6.

The invention is in the following described in its application to the production of pineapple cuttings without, however, restricting the same in any way to a particular type of fruit or vegetable.

Numeral 2 denotes a work table; a hopper 11 to receive the cut pineapple parts is located underneath the table. A cylindrical receptacle 20 is located in the table 2 wherein cutter blades schematically indicated at 10 are mounted in the manner disclosed in my prior patents. This cutter blades provided receptacle is more or less identically constructed with the cutter receptacles of my prior patents; the cutter blades are driven from a mechanism located in housing 34; in view of the disclosure in my patents a detailed description of this cutter means does not seem to be required.

The feeder forming the subject matter of this invention comprises a preferably cylindrical tube 1 for the supply of the fruits, such as pineapples to the cutter receptacle 20. The feeder tube 1 is on the major part of its length provided with a fill opening 21, see Figures 6, 7, 8; a closure cover 3 is hingedly attached to the feeder tube 1; the cover is provided with an operating handle 5; stop 30, Figure 8, is provided to hold the cover in its open state; stops 34, hold the feeder tube in the closed position.

To facilitate the loading of the skinned and cored pineapples into the feeder tube 1 a trough 9 is provided which is located on a support 35, Figure 7, this trough may be placed, for loading purposes, alongside the feeder; the trough 9 has the same shape as the feeder tube with the only difference that it is semicylindrical. A slot 8 is provided in the lower part of the feeder tube 1 for the entrance of a closure slide 7, see Figure 4.

The feeder tube 1 is by means of a hinge provided member 23, Figure 2, attached to the work table 2. The feeder 1 is moved into its vertical and horizontal working positions by a rope or wire 31 which is actuated by a toothed wheel arrangement 32, 33 the latter being supported by a frame structure 12 located on the work table 2.

The transfer of the fruits from the feeder into the cutter receptacle 20 is effected by a pusher or weight 14; to hoist and to lower this weight into the feeder 1 a rope or wire 15 is provided which runs over pulley 13 fastened to the frame structure 12. Rope 15 is operated by the toothed wheels 16, 18 which are operatively connected through chain 17. A ratchet 24 cooperating with wheel 18, see Figures 1, 2, is provided to prevent an unintentional dropping down of weight 14. A stop 28 prevents the lifting of the weight beyond pulley 13.

As it is important that the weight 14 slides through the feeder tube 1 without resistance a lubricating device is provided which is fed from tank 29 supported by frame 12. A small receptacle 27 is located for this purpose at the upper end of weight 14; the lubricant supplied from tank 29 into receptacle 27 flows through holes 19 between the inner wall of tube 1 and the weight, see Figures 1, 5, thereby lubricating the inner face of the feeder tube. Guides 22 serve to direct a safe passage of weight 14 through feeder tube 1.

The feeder is operated as follows.

A number of cored and trimmed pineapples are loaded next to each other in trough 9; the latter is placed next to the feeder tube as apparent from Figures 6, 7, 8, which has been lowered into the horizontal position; the cover 3 of the feeder tube 1 is opened and the contents of the trough are transferred without change of position into the feeder tube 1 by lifting the trough 9 into the position indicated in dotted lines in Fig. 7. Slide 7 has been previously closed. After loading the tube cover 3 is closed and the feeder tube is now pulled into the vertical position above the cutter receptacle 20, as shown in Fig. 1. The slide 7 is opened and the weight 14 is lowered into the feeder tube thereby pushing the fruits into the cutter receptacle where they are cut into desired shapes as described in my prior patents. Lubricant is fed into the tube 1 from receptacle 29.

A flexible feed of the fruits through the feeder tube is obtained in this manner; as a result thereof jamming of the fruit in the feeder and particularly in the cutter receptacle is fully eliminated; an unobstructed supply of the fruits is assured; work stoppages as well as injuries to the cutter equipment are eliminated. The machine works smoothly and continuously and the operating speed can be accordingly increased.

The invention has been described with reference to a preferred embodiment and it will be understood that many variations and modifications thereof may be resorted to without departure from the scope of the invention as defined in the following claim.

What I claim is:

In a device for feeding fruits into a receptacle provided with cutters, an open ended vertical feed tube, means adjacent one end of the tube to tilt said feed tube into a horizontal position for the purpose of charging the fruits into the same and into a vertical position to feed the charged fruits from the tube into said receptacle, the receptacle and the feed tube having substantially the same diameter and being coaxially aligned in the vertical fruit feeding direction, a closure slide in the lower end of said feed tube adjacently located to said receptacle, a cylindrical slide weight having a diameter substantially equal to the inner diameter of said feed tube located on top of the upper open end thereof and adapted by cable suspension to be lowered into said feed tube and a lubricant containing vessel on top of said weight having holes in the side wall to introduce the lubricant between said weight and the inner wall of said feed tube.

EUGENE ROBERT JAGENBURG.

REFERENCES CITED

The following references are of record in the file of this patent:

UNITED STATES PATENTS

| Number | Name | Date |
|---|---|---|
| Re. 14,707 | Arbuckle | Aug. 19, 1919 |
| 236,164 | Kendall | Jan. 4, 1881 |
| 393,149 | Gates | Nov. 20, 1888 |
| 1,418,443 | Jagenburg | June 6, 1922 |
| 1,903,854 | Tachi | Apr. 18, 1933 |
| 2,037,349 | Svetlik | Apr. 14, 1936 |
| 2,209,295 | Hjelte | July 23, 1940 |
| 2,236,176 | Jagenburg | Mar. 25, 1941 |
| 2,299,866 | Willard | Oct. 27, 1942 |
| 2,345,074 | Sargent | Mar. 28, 1944 |
| 2,399,087 | Abbott | Apr. 23, 1946 |
| 2,470,340 | Cook | May 17, 1949 |
| 2,526,014 | Ferber | Oct. 17, 1950 |

FOREIGN PATENTS

| Number | Country | Date |
|---|---|---|
| 21,073 | Great Britain | Oct. 1, 1903 |